Figure 1:
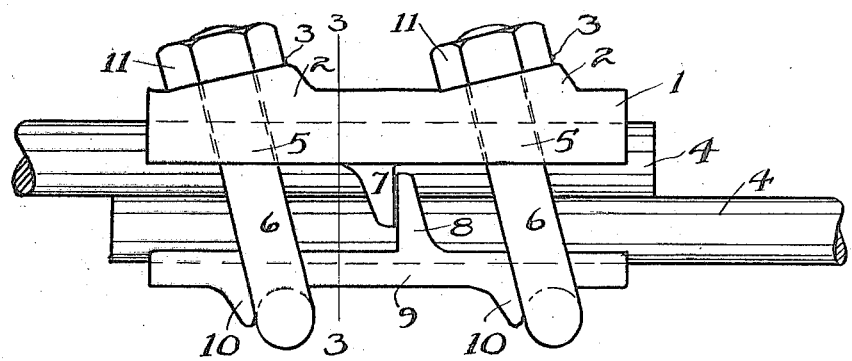

B. M. MATHIAS.
ROD CLAMP.
APPLICATION FILED JULY 12, 1917.

1,260,566.

Patented Mar. 26, 1918.

Inventor:
Berton M Mathias
by C. B. Ewochs
Attorney

UNITED STATES PATENT OFFICE.

BERTON M. MATHIAS, OF MINNEAPOLIS, MINNESOTA.

ROD-CLAMP.

1,260,566.   Specification of Letters Patent.   Patented Mar. 26, 1918.

Application filed July 12, 1917.   Serial No. 180,226.

*To all whom it may concern:*

Be it known that I, BERTON M. MATHIAS, a citizen of the United States, and a resident of Minneapolis, in the county of Hennepin and State of Minnesota, have invented certain new and useful Improvements in Rod-Clamps, of which the following is a specification.

One object of my invention is to provide in a rod clamp a clamping bolt positioned at an acute angle with the rod clamped therein and means for preventing the moving of said bolt with respect to the rods of the clamp as the bolt is drawn home.

Another object of my invention is to provide in a rod clamp a direct transverse clamping bolt and a second clamping bolt positioned at an acute angle to the clamped rod to take a portion of the stress through the angular positioned bolt.

With these and incidental objects in view the invention consists of certain novel features of construction and combination of parts, the essential elements of which are hereinafter described with reference to the drawing which accompanies and forms a part of this specification.

Figure 2:
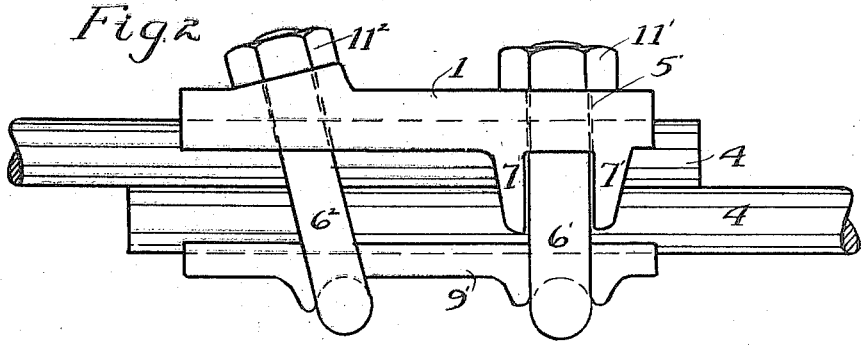
Figure 3:
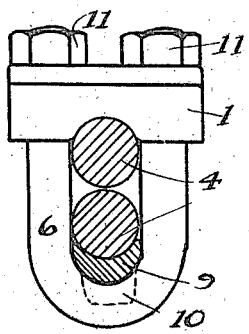

In the drawing Figure 1 is a side elevation of my improved rod clamp; Fig. 2 is a like view of an alternate construction of the clamp; and Fig. 3 is a section taken on the line 3—3, Fig. 1.

In the construction shown in Fig. 1, the body 1 has two bosses 2 the surfaces 3 of which are at an acute angle to the rods 4 to be clamped.

Apertures 5 permit the passing through the body of a pair of U bolts 6 and a pair of lugs 7 projecting fork fashion from the body engage with a similar pair of lugs 8 carried by the cap 9.

The cap 9 has the bolts 6 passed over it and lugs 10 serve to keep the bolts in position as the nuts 11 are drawn up, and the engagement of the lugs 7 and 8 prevent the cap or body sliding on the rod as pressure is put on the nuts.

In the modification shown in Fig. 2 the body 1' has two pair of forked lugs 7' extending downwardly, and a U bolt 6' straddling the cap 9' passes between each pair of forked lugs 7' through the apertures 5', and nuts 11' are used to draw the bolt and clamp up tightly against the rods 4.

When the bolt 6' has been drawn snugly home, then the bolts $6^2$, similar to the bolts 6, Fig. 1, are drawn snugly home by the nuts $11^2$.

While I have described my invention and illustrated it in several designs, I do not wish it understood that I limit myself to these constructions, as it is evident that the invention may be varied in many ways within the scope of the following claims.

Claims:

1. In a rod clamp the combination of a body having two bosses thereon an outer surface of which is positioned at an acute angle to the inner rod receiving surface, said body having apertures extending therethrough perpendicular to said outer surface of said bosses, a U bolt, a lug extending from said body, a cap for coöperation with said body having a lug extending inwardly to engage with the inwardly extending lug of said body, and shoulders extending outwardly from said cap to position said U-bolts therebehind, whereby said shoulders and the engagement of said lugs will aline U-bolts passed through the apertures of said body at an acute angle to rods clamped therebetween.

2. In a rod clamp the combination of a body having a boss thereon, the outer surface of which is at an acute angle to a rod clamped in said body, a U-bolt passing through an aperture in said boss, a cap coöperating with said body and having alining means to shoulder said U-bolt, and means for preventing the slippage of said body or cap as said U-bolt is drawn home.

3. In a rod clamp the combination of a body for receiving therein a rod, a cap for fitting over a second rod to be clamped to said first rod, forked lugs extending from said body and said cap and engaging with each other, and means for clamping said body and said cap with said lugs and engaging over a pair of rods, said means being drawn at an acute angle to the rods carried by said clamp.

BERTON M. MATHIAS.

Copies of this patent may be obtained for five cents each, by addressing the "Commissioner of Patents, Washington, D. C."